United States Patent [19]

Park

[11] Patent Number: 5,528,930
[45] Date of Patent: Jun. 25, 1996

[54] ENGINE MISFIRE DETECTION SYSTEM AND METHOD

[75] Inventor: Kyong M. Park, Thousand Oaks, Calif.

[73] Assignee: Kavlico Corporation, Moorpark, Calif.

[21] Appl. No.: 273,949

[22] Filed: Jul. 12, 1994

Related U.S. Application Data

[63] Continuation-in-part of Ser. No. 88,163, Jul. 7, 1993, Pat. No. 5,369,989.

[51] Int. Cl.$^6$ .................................................. G01M 15/00
[52] U.S. Cl. .................................................. 73/117.3
[58] Field of Search ......................... 73/115, 116, 117.3; 364/431.07, 431.08

[56] References Cited

U.S. PATENT DOCUMENTS

| | | | |
|---|---|---|---|
| 3,924,457 | 12/1975 | Oshima et al. | 73/116 |
| 3,965,677 | 6/1976 | Goto et al. | 73/117.3 |
| 3,983,754 | 10/1976 | Deguchi et al. | 60/277 |
| 4,040,294 | 8/1977 | Matsuda et al. | 73/117.3 |
| 4,083,234 | 4/1978 | Aono et al. | 73/116 |
| 4,189,940 | 2/1980 | Hulls et al. | 73/117.3 |
| 4,302,814 | 11/1981 | Full et al. | 73/116 |
| 4,329,732 | 5/1982 | Kavli et al. | 73/718 |
| 4,388,668 | 6/1983 | Bell et al. | 73/718 |
| 4,424,709 | 1/1984 | Meier, Jr. et al. | 73/117.3 |
| 4,617,607 | 10/1986 | Park et al. | 73/718 |
| 4,739,649 | 4/1988 | Tanaka | 73/117.3 |
| 4,744,243 | 5/1988 | Tanaka | 73/117.3 |
| 4,892,075 | 1/1990 | Iriyama et al. | 73/117.3 |
| 4,928,255 | 5/1990 | Brennecke et al. | 364/558 |
| 5,116,259 | 5/1992 | Demizu et al. | 73/117.3 |
| 5,127,262 | 7/1992 | Demizu et al. | 73/117.3 |
| 5,269,178 | 12/1993 | Vigmostad et al. | 73/116 |
| 5,321,979 | 6/1994 | Mc Kendry et al. | 73/117.3 |
| 5,357,790 | 10/1994 | Hosoya | 73/117.3 |
| 5,365,780 | 11/1994 | Feldkamp | 73/117.3 |
| 5,369,989 | 12/1994 | Gates, Jr. et al. | 73/115 |

*Primary Examiner*—Richard Chilcot
*Assistant Examiner*—George M. Dombroske
*Attorney, Agent, or Firm*—Poms, Smith, Lande & Rose

[57] ABSTRACT

An engine misfire detection system and method for successfully detecting and identifying misfiring engine cylinders over varying engine cycle rates and under varying engine load conditions in real time are embodied in a manifold absolute pressure sensor, an engine position (CID) sensor, a misfire sensor and misfire detection system electronics. The system utilizes empirical misfire signal signatures of misfire sensor signal range values over different engine cycle rates and under varying engine load conditions to detect a misfire condition. The system further utilizes an index ratio, which is determined from a number of samples of the misfire sensor signal taken during an engine cycle and from the engine's rate of operation, to identify which cylinder of the engine has misfired.

23 Claims, 9 Drawing Sheets

ENGINE MISFIRE DETECTION SYSTEM AND METHOD

CROSS REFERENCE TO RELATED APPLICATIONS

This application is a continuation-in-part of U.S. application. Ser. No. 08/088,163, filed Jul. 7, 1993, entitled MISFIRE DETECTION IN AUTOMOBILE ENGINE, by Gates, Jr. et al., now U.S. Pat. No. 5,369,989, and is related to U.S. application. Ser. No. 08/188,580, filed Jan. 28, 1994, entitled AUTOMOTIVE MISFIRE CYLINDER IDENTIFICATION SYSTEM, by Park, now U.S. Pat. No. 5,415,036.

BACKGROUND OF THE INVENTION

1. Field of the Invention

The present invention relates to an engine misfire detection system and, more particularly, pertains to an engine misfire detection system and method for detecting a misfire condition and identifying misfiring engine cylinders over varying engine rates and under varying engine load conditions.

2. Description of the Related Art

When an automobile engine misfires, it would be desirable to quickly and accurately identify the misfiring cylinder so that appropriate repairs may be made. In the past, various methods have been employed to accomplish this goal. The most common technique is to run the engine at a fairly low speed and successively disable the cylinders, one by one, and check for changes in motor sound and/or vibration, with disabling of the misfiring cylinder not causing any change, while the disabling of other cylinders producing further (intentional) misfiring and a change in engine sound or vibration. However, the foregoing method is time consuming; and, with intermittent misfiring conditions, it is difficult to identify the source of the problem.

Accordingly, an object of the present invention is to provide an engine misfire detection system and method for successfully detecting and identifying misfiring engine cylinders under varying engine cycle rates and under varying engine load conditions in real time.

SUMMARY OF THE INVENTION

In accordance with a specific illustrative embodiment of the present invention, an engine misfire detection system for successfully detecting and identifying misfiring engine cylinders under varying engine cycle rates and varying engine load conditions includes a manifold absolute pressure sensor, an engine position (CID) sensor, a misfire sensor, and misfire detection system electronics. The manifold absolute pressure sensor is coupled to an intake manifold of an engine and provides a manifold absolute pressure signal responsive to a load condition of the engine. The engine position (CID) sensor provides an engine position (CID) signal in synchronism with revolutions of a cam shaft of the engine when cylinder no. 1 reaches top dead center. This signal is referred to as the cylinder identification or CID signal by Ford Motor Car Co. The misfire sensor is coupled to an exhaust manifold of the engine and provides a misfire sensor signal responsive to pressure changes within the exhaust manifold. The misfire detection system electronics utilize misfire signal signatures or characteristics which correlate normal operating condition misfire sensor signal range values of the misfire sensor to different speeds or revolutions per minute (rpm) of the engine under varying engine load conditions. The misfire detection system electronics detect a misfire condition when a minimum value of the misfire sensor signal occurring during a cycle of the engine is outside the normal operating condition misfire sensor signal range values for the speed and load condition of the engine during the cycle for which a misfire condition has been detected. The misfire detection system electronics correlate the misfire sensor signal with the engine position (CID) signal to generate a signal identifying a misfiring cylinder of the engine when the misfire condition is detected.

In a further aspect of the present invention, the misfire detection system electronics utilize an index ratio, which is determined from a number of samples of the misfire sensor signal taken by a processor of the misfire detection system electronics during the cycle for which the misfire condition has been detected and from the engine rate. The index ratio correlates the misfire sensor signal with the engine position (CID) signal to identify a misfiring cylinder of the engine when the misfire condition is detected.

In accordance with a broader aspect of the invention, an engine misfire detection system includes a pressure sensor coupled to the exhaust system of the engine for providing electrical signals corresponding to the exhaust pressure, circuitry for providing a range of normal engine operating exhaust pressure signals, detection circuitry for indicating an exhaust signal which drops below the normal operating range, and sensors for indicating the speed and load conditions of the engine, and for adjusting the normal exhaust pressure range in response to changes in both the speed and load conditions of the engine.

In accordance with a supplemental feature of the invention, the range adjustments are made without significant time displacement of the output signals.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

Figure 1:
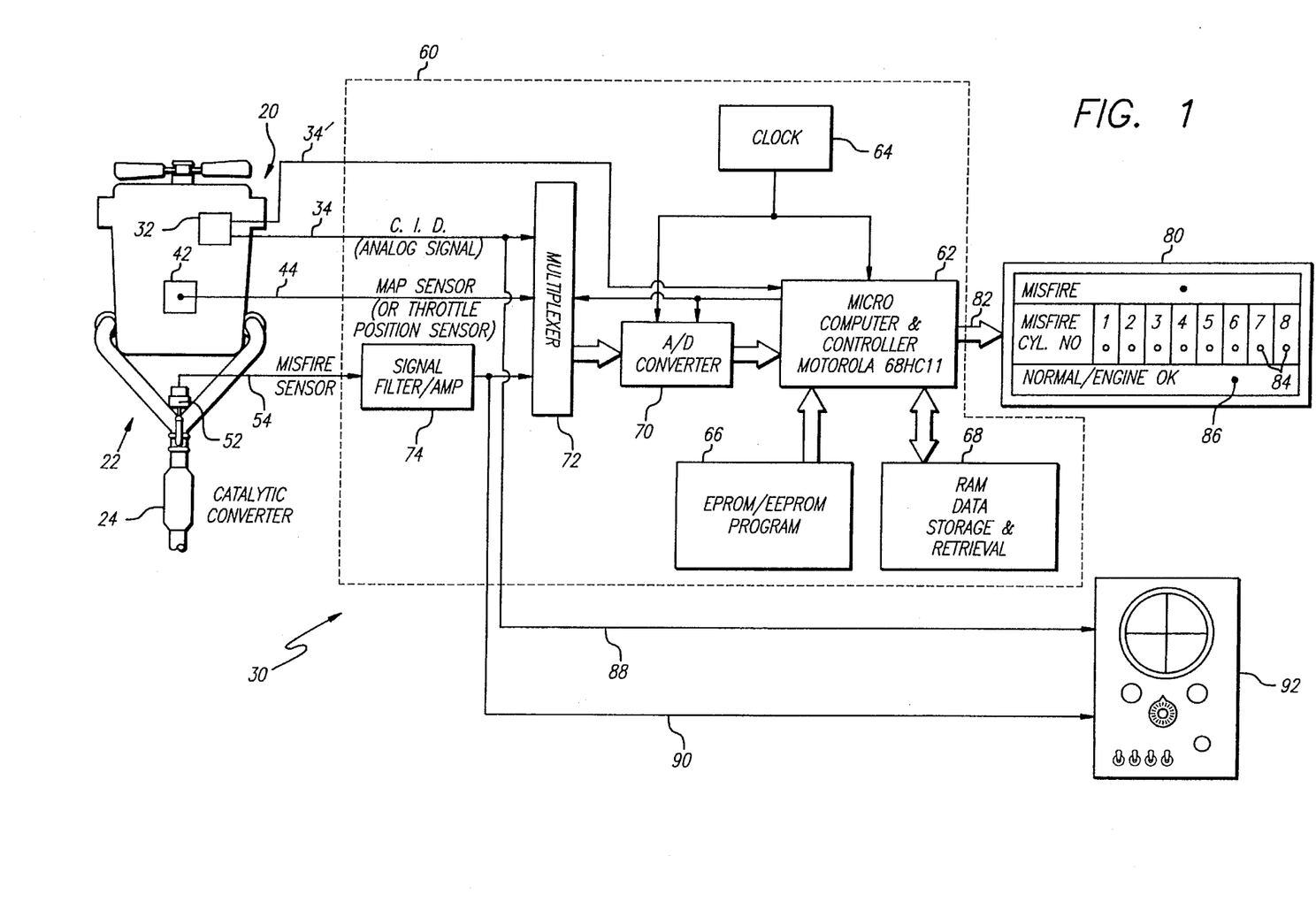
FIG. 1 is a block diagram of an engine and an engine misfire detection system illustrating the present invention.

FIG. 1 shows an engine 20 and an engine misfire detection system 30 illustrating the principles of the present invention. Electrical signals indicative of various engine performance parameters are measured by a plurality of sensors included within the engine misfire detection system 30. In the illustrated preferred embodiment, the detection system 30 includes the conventional source (here, an engine position (CID) sensor 32) for providing an engine position (CID) signal on lead 34 in synchronism with revolutions of a camshaft of the engine. The aforementioned sensors also include a manifold absolute pressure sensor 42 coupled to an intake manifold of the engine for providing a manifold absolute pressure signal on lead 44 responsive to and indicative of a load condition of the engine. Additionally, the detection system 30 includes a pressure sensor or misfire sensor 52 coupled to the exhaust manifold of the engine for providing a misfire sensor signal on lead 54 responsive to pressure changes within the exhaust manifold.

The engine misfire detection system 30 receives signals 34, 44, 54 and uses these signals to detect and identify misfiring engine cylinders under varying engine cycle rates and varying engine load conditions in real time. The engine position (CID) signal 34 may be provided to the detection system 30 in analog form. For example, the engine position (CID) sensor 32 may be an inductive coil sensor positioned near the engine flywheel generating an analog pulse in response to the spark plug signal. Alternatively, a digital engine position (CID) signal 34' may be provided by utilizing an optical encoder as the engine position (CID) sensor 32. As may be readily appreciated, alternative methods and apparatuses for measuring the rate at which the engine's camshaft is turning and the position of the camshaft relative to the engine block are contemplated by the present invention. It should be further noted that an engine position (CID) (CID) sensor is normally provided with most modern automobiles.

The manifold absolute pressure sensor 42 measures the intake manifold pressure which is a good overall indicator of the load condition of the engine. As a greater load is applied to the engine, the pressure measured by the manifold absolute pressure sensor 42 proportionally increases. A preferred manifold absolute pressure sensor 42 is a 15 psi absolute sensor such as the Kavlico P-15 absolute pressure sensor manufactured by Kavlico Corporation of Moorpark, Calif. Alternatively, the manifold absolute pressure signal on lead 44 may be generated by simply providing a throttle position sensor.

The misfire pressure sensor 52 may be of the type described for example in U.S. Pat. No. 4,388,668, granted Jun. 14, 1983, and assigned to the Assignee of the present application. The pressure transducer includes two disks of ceramic material, and in one operative embodiment, the disks are approximately 1.27 inches in diameter and the diaphragm is approximately 14.5 thousandths of an inch thick. The two ceramic disks are preferably spaced apart by glass frit by a relatively small distance such as a few thousandths of an inch, and they have space conductive plates on their inner surfaces, which form a capacitor. As the diaphragm is flexed with pressure changes, the capacitance of the spaced plates changes. A small printed circuit board transforms the changes in capacitance to generate a varying electrical signal transducer output. A typical circuit employed for the aforementioned purpose is disclosed in U.S. Pat. No. 4,398,426, granted Aug. 16, 1983, and assigned to the Assignee of the present invention. Such transducers are also available from Kavlico Corporation of Moorpark, Calif., as 10 psi pressure transducers.

Figure 2:
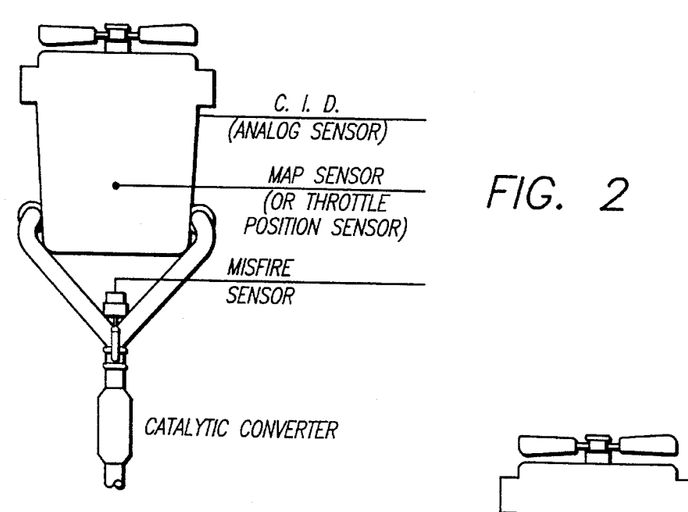
FIG. 2 is a partial cross-sectional view of an engine and its exhaust manifold with a misfire sensor attached thereto.
Figure 3:
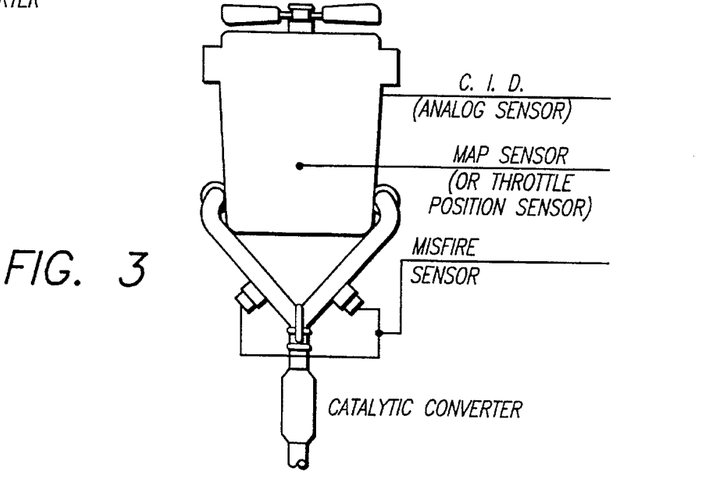
FIG. 3 is a partial cross-sectional view of an engine and its exhaust manifold with two misfire sensors attached thereto.
Figure 4:
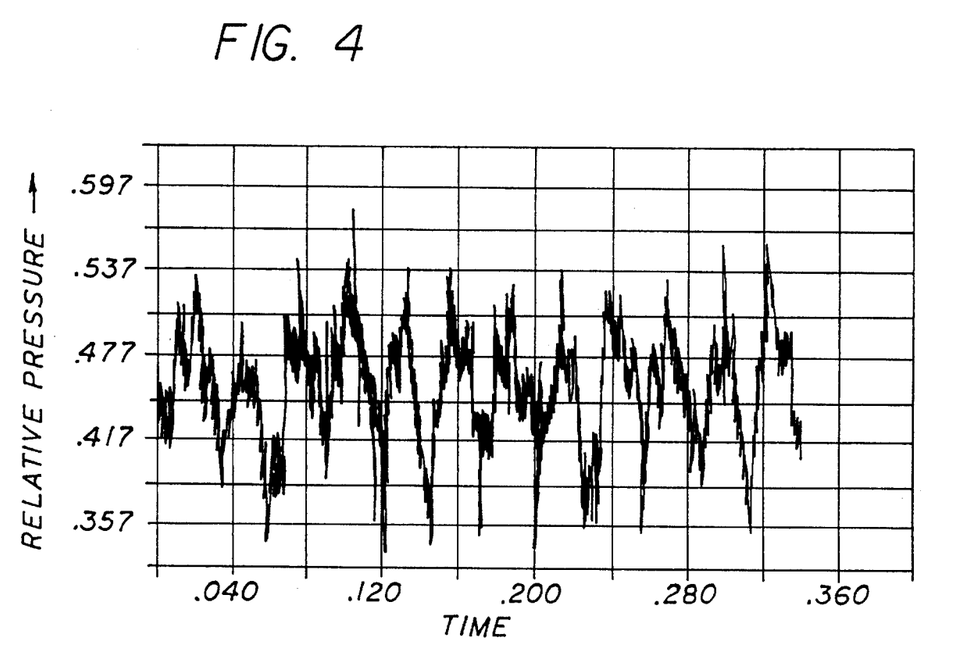
FIG. 4 is a plot of a misfire sensor signal provided by the misfire sensor of FIG. 2 under normal engine operating conditions.
Figure 5:
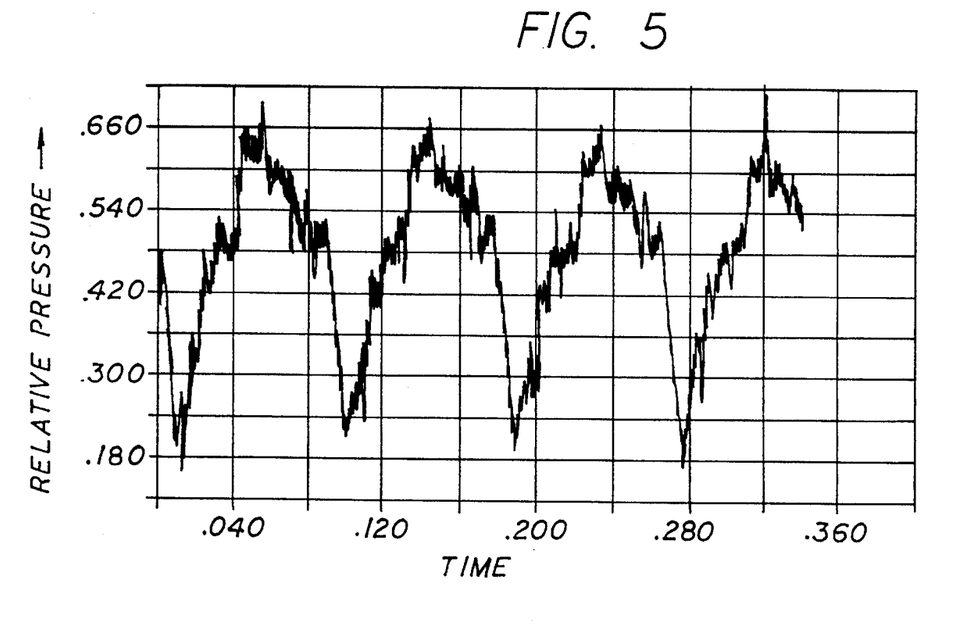
FIG. 5 is a plot of a misfire sensor signal provided by the misfire sensor of FIG. 2 during a misfire condition of the engine.

One or several misfire sensors 52 may be included in the detection system 30 as is shown in FIGS. 1 through 3. Such sensors 52 are preferably coupled to the exhaust manifold system 22 "upstream" of the catalytic converter 24 with each misfire sensor 52 being positioned substantially equidistantly from the engine block. The detection system 30 detects a misfire condition when the misfire sensor signal 54 is determined to be outside a range of values which have been empirically determined to be acceptable for the present operating speed and load condition of the engine. A misfire condition is characterized by a sharp decrease in the pressure in the exhaust manifold system 22. If the voltage of the misfire sensor signal 54 falls below the aforementioned acceptable range of values, for example, the detection system 30 detects a misfire condition. FIGS. 4 and 5 show the misfire sensor signal on lead 54 under normal operating conditions and under a misfire condition, respectively. The sharp periodic dip in the voltage plot shown in FIG. 5 is indicative of a misfiring engine cylinder which causes the pressure in the exhaust manifold system 22 and thus the voltage of the misfire sensor signal on lead 54 to decrease.

The "upstream" positioning of the misfire sensor 52 in the exhaust manifold system 22 relative to the catalytic converter 24 also allows the detection system 30 to detect an unacceptably high increase in the pressure measured within the exhaust manifold system 22 which may, for example, be caused by a blockage in the catalytic converter 24. As before, the detection system 30 utilizes the empirically determined range of misfire sensor signal values which are known to be acceptable under normal operating conditions (when the engine is operating at a particular rate and under a particular load condition) to determine if the pressure in the exhaust manifold system 22 is unacceptably high. The misfire sensor signal 54 may also be employed by the detection system 30 to provide noise control for the engine's exhaust system.

As is best illustrated in FIG. 1, the engine misfire detection system 30 includes misfire detection system electronics 60 which receive signals 34, 44, 54. A preferred embodiment of the present invention provides misfire detection system electronics 60 which further include a controller or processor 62, a clock 64, a read only memory (ROM) 66, a random access memory (RAM) 68, an A/D converter 70, a multiplexer 72, and a signal filter/amplifier 74. A preferred detection system 30 additionally includes a display unit 80 which receives a signal 82 identifying a misfiring cylinder of the engine when a misfire condition is detected by the detection system 30. The display unit 80 for a V-8 style engine includes eight misfire indicators 84 corresponding to the respective cylinders of the engine. The misfire indicators 84 may, for example, be red light emitting diodes (LED) or any other suitable visible and/or audible indicator which identifies a misfiring cylinder to the mechanic performing a diagnostic check of the engine, a driver of the automobile, etc. The display unit 80 may, but does not necessarily, additionally include a normal/engine OK indicator 86 in the form of a green LED, for example. Consistent with the goal of providing a detection system 30 with flexible diagnostic capabilities, the misfire detection system electronics 60 also include accessible terminals for measuring voltages of interest such as terminals 88, 90 which respectively allow a technician to monitor the engine position (CID) signal 34 and a filtered misfire sensor signal 54 at an oscilloscope 92, for example.

It has been found that the pressure and resultant output voltage of the misfire sensor 52 varies depending upon the rate at which the engine is running and upon the load applied to the engine. Under normal operating conditions, ranges of misfire sensor signal values may be measured and used by the misfire detection system electronics 60 to determine when the pressure in the exhaust manifold system 22 is inappropriately high or low at a particular engine speed and load condition. The processor 62 which is preferably a MC68HC11 type controller manufactured by Motorola Corporation serves several functions. First, the processor 62 receives and utilizes the misfire sensor signal at lead 54 to determine whether or not a misfire has occurred in any of the cylinders during a particular cycle of the engine. The beginning and end of an engine cycle are respectively designated by two consecutive output pulses of the engine position (CID) signal at lead 34 (hereinafter CID pulses). Second, the processor 62 monitors the range of the misfire sensor signals 54 received during a frame of data, (i.e., the range of all misfire sensor signals 54 sampled by the processor 62 between consecutive CID pulses). The difference between the maximum voltage and minimum voltage ($P_{max}$ and $P_{min}$, respectively) of the misfire sensor signals at lead 54 detected during such a time interval provides a range signal (RANGE) corresponding to a particular engine cycle. Thus, a lowest peak value ($P_{min}$) is measured and a range (RANGE) of the misfire sensor signal at lead 54 is calculated by the processor 62 during an engine cycle and used to detect a misfire condition occurring during that particular cycle in real time by comparing these values to empirically derived misfire signal signatures. The engine misfire detection system 30 provides a simplified detection scheme which does not require but may utilize statistical processing techniques.

Figure 6:
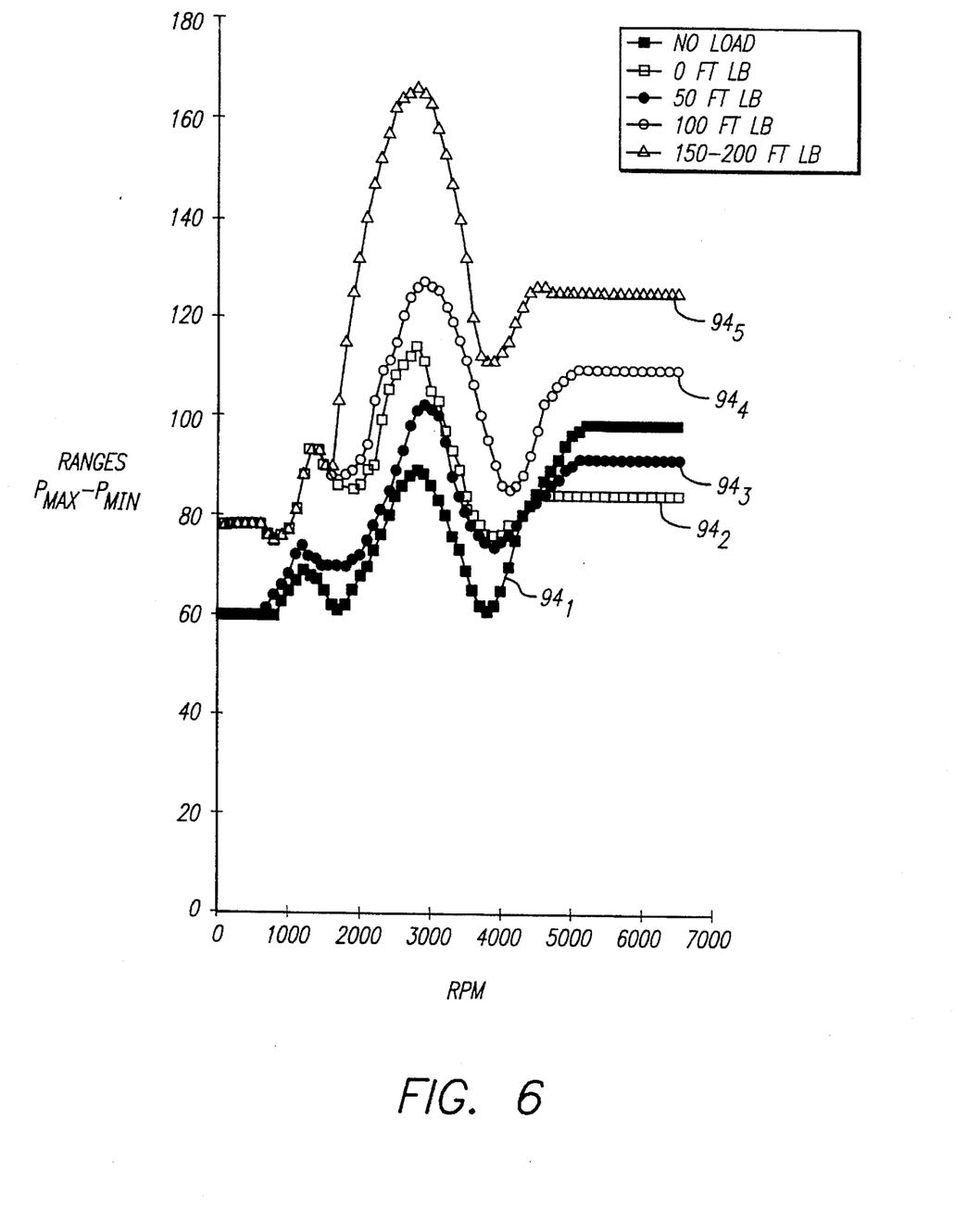
FIG. 6 shows plots of misfire sensor signal range data over different engine rates and under different engine load conditions.

FIG. 6 shows a group of misfire signal signatures or characteristics which illustrate the observed range, maximum minus minimum pressures of the misfire sensor signal at lead 54 plotted against the rate at which the engine is running; each of the misfire signal plots corresponding to a different load condition of the engine. When no load is applied to the engine, the misfire signal signature $94_1$ of solid square data points plots observed normal operating condition misfire sensor signal range values along the vertical axis against the rate of the engine along the horizontal axis. Under a "light load" condition (e.g., the engine is idling with the air conditioner on) the misfire signal signature $94_2$, of hollow square data points was observed. Similarly, the misfire signal signatures $94_3$, $94_4$, $94_5$ show the correlation between normal operating condition misfire sensor signal range values and different cycle rates of the engine as observed at a 50 ft-lb, 100 ft-lb, and 150–200 ft-lb load condition of the engine. The misfire signal characteristics 94 are stored in a suitable memory device accessible by the processor 62, such as the ROM 66 or the RAM 68 (FIG. 1).

Real time processing is difficult utilizing prior art techniques which require data to be collected for at least an entire frame for averaging and which utilize computationally intensive calculations such as square root operations. The processor 62 may alternatively employ a predicted average scheme thereby eliminating some of the burdens associated with statistical processing techniques.

Figure 1A:
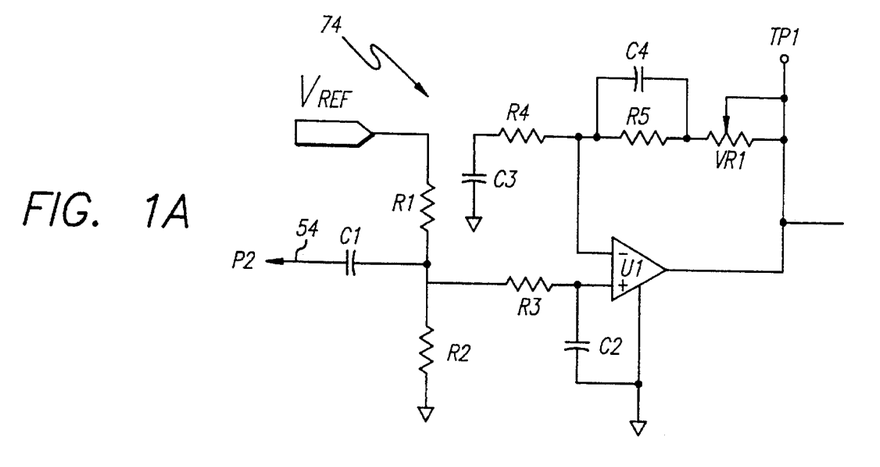
FIG. 1A is a circuit schematic of a signal filter/amplifier of the engine misfire detection system.

FIG. 1A shows the signal filter/amplifier 74 in greater detail. The signal filter/amplifier 74 receives the misfire sensor signal at lead 54 and removes any direct current signal component therefrom. The amplifier U1 provides a filtered, alternating current component of the misfire sensor signal 54 to the processor 62 which uses this output of U1 to obtain the RANGE, Pmin and Pmax values for each engine cycle. The reference voltage $V_{REF}$ is a conventional power supply voltage at +5.0 Vdc, for example.

It has been additionally observed that the voltage $V_{REF}/2$ provides a good approximation of an average of the AC component of the misfire sensor signal at lead 54 which is used in the SVAR calculation. When analog circuit components such as those illustrated in FIG. 1A are selected, the gain of the op amp U1 is set very precisely, thereby allowing the foregoing predicted average scheme to be employed in lieu of more involved statistical calculations.

Figure 7:
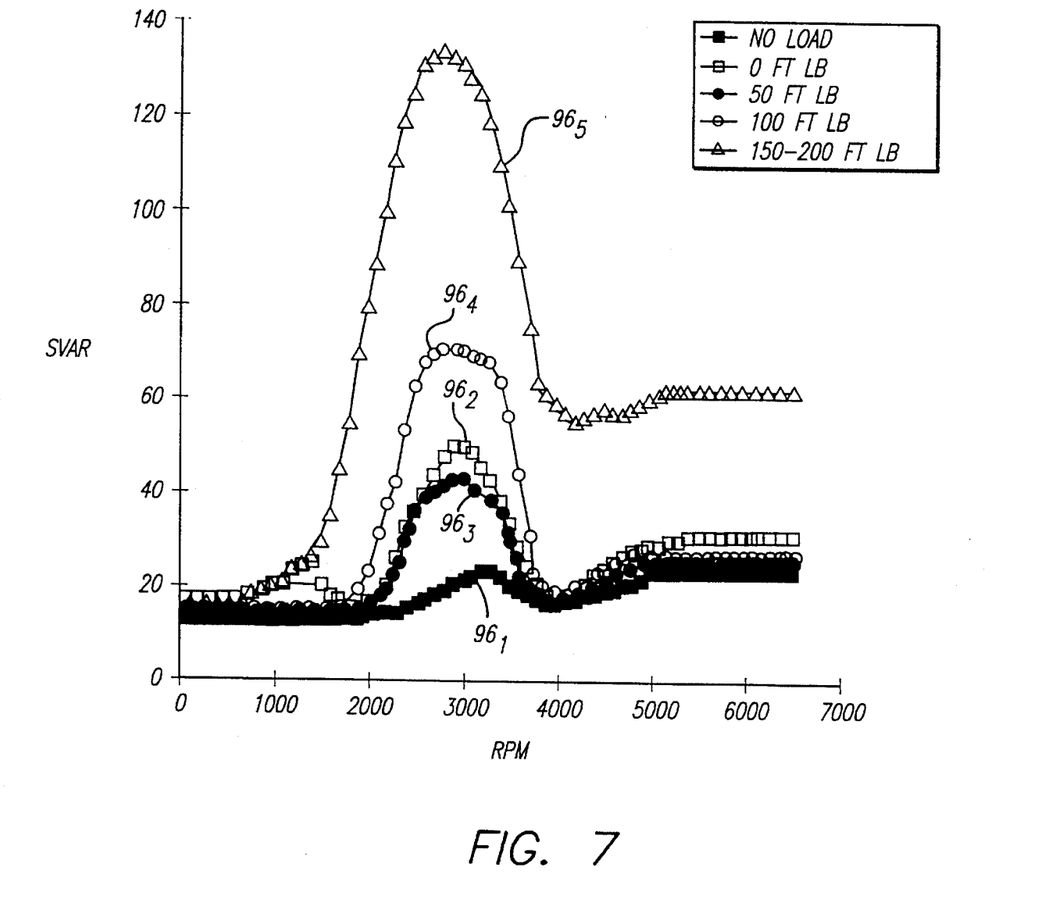
FIG. 7 is a plot of standard variances of the average of the misfire sensor signal over different engine rates and under different engine load conditions.

If the processor 62 and the misfire detection system electronics 60 are designed with sufficient processing capability, then the processor 62 may also be programmed to calculate a standard variance of the average (SVAR) of the misfire sensor signal at lead 54 in real time in making the misfire determination. As with the plots of the misfire signal characteristics, FIG. 7 shows that the standard variance of the average of the misfire sensor signal at lead 54 over different engine speeds differs under different engine load conditions. More specifically, FIG. 7 shows SVAR signatures or characteristics $96_1$, $96_2$, $96_3$, $96_4$, $96_5$ which respectively correspond to calculated SVARs over engine rate as observed under a no load condition, a "light load" condition, 50 ft-lbs, 100 ft-lbs, and 100–200 ft-lbs. As With the misfire signal characteristics 94, the SVAR characteristics 96 may also be stored in a memory device such as the ROM 66 or the RAM 68. Tables 1 and 2 which follow form a part of this patent application and respectively include the observed data points plotted in FIGS. 7 and 8. One text describing statistical analysis techniques which may be employed in a preferred implementation of the invention is "Numerical Recipes in C" or "The Art of Scientific Computing," 2nd Ed., by William H. Press, et al., Cambridge University Press.

If a rate at which the processor 62 samples the misfire sensor signal 54 remains constant over varying engine rates, the resolution of the sample data necessarily decreases as rotations per minute (RPM) of the engine increase. Accordingly, the present invention may include increasing a sample rate of the processor 62 as the speed of the engine increases in RPMs.

Figure 8:
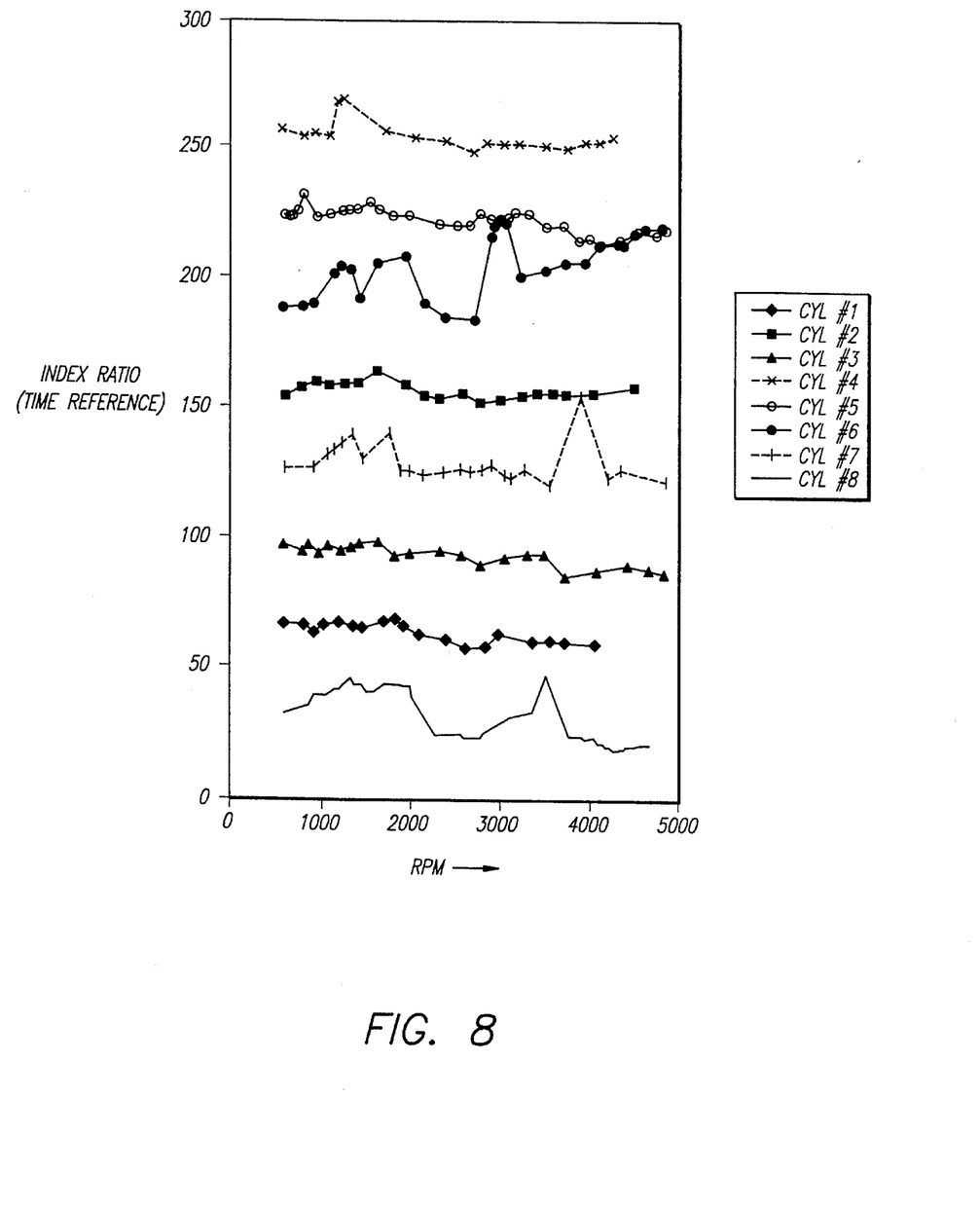
FIG. 8 is a plot of corrected index ratios for each cylinder of a V-8 style engine where 360 samples per frame were taken by a processor of the engine misfire detection system and where the engine was subjected to a 50 ft-lb load.

Successive CID pulses serve as reference points for a beginning and an end of a single engine cycle during which all cylinders fire once. Since the cylinders of an engine fire in a predefined order, the CID pulses serve as reference points in time where the processor 62 begins and ends sampling the misfire sensor signal at lead 54 for a particular engine cycle. When different cylinders of an engine misfire, the observed pressure minimum in the misfire sensor signal at lead 54 appears at different positions within the frame. However, the time intervals between the pressure decreases of successively misfiring engine cylinders are not necessarily equally spaced. In fact, as indicated in FIG. 8, it has been observed that the lowest peak values of the misfire sensor signal at lead 54, for each of the different cylinders when misfiring, are not equally spaced in time from one successive misfiring cylinder to the next, varying in position within the frame depending upon the rate of the engine and the load applied thereto. However, it may be seen that the timing of the successive cylinder misfiring points as indicated in FIG. 8 is generally sequential with minor variations at different engine speeds.

After the misfire detection system electronics 60 have detected a misfire condition, the processor 62 utilizes an index ratio to determine which cylinder misfired. The index ratio is determined from the rate that the engine is operating at and from the number of samples of the misfire sensor signal 54 taking during the engine cycle for which a misfire condition has been detected. The index ratio correlates the misfire sensor signal 54 with the engine position (CID) signal 34 to generate a signal identifying a misfiring cylinder of the engine after a misfire condition is detected. More specifically, the index ratio is determined by dividing the number of sample intervals between the CID signal and the occurrence of the pressure minimum point $P_{min}$, by the total number of sample intervals between successive CID signals.

The accuracy with which the processor 62 identifies a particular misfiring cylinder is enhanced by adjusting the index ratio with index ratio correction information which compensate for the effects of different engine cycle rates and varying engine load conditions on the position of $P_{min}$ relative to the CID pulses. FIG. 8 shows corrected index ratios for each cylinder of a V-8 style engine where 360 samples per frame were taken by the processor 62 and where the engine was subjected to a 50 ft-lb load. In FIG. 8, the 360 samples were rescaled to 256 data points. The corrected index ratios for each cylinder are plotted over engine speed and have been adjusted by the index ratio correction information which compensate for the effects of different load conditions. The index ratio correction information may be stored in a memory device such as the ROM 66 or the RAM 68. Table 3 which follows forms a part of this patent application and includes the observed data points plotted in FIG. 8.

With reference to FIG. 1, the processor 62 and the A/D converter 70 receive timing signals from the clock 64. The processor 62, in turn, controls the multiplexor 72 which receives the engine position (CID) signal at lead 34, the manifold absolute pressure signal at lead 44, and the misfire sensor signal at lead 54. Where the engine position (CID) sensor 32 is an optical encoder or other device generating a digital engine position (CID) signal 34', such an output signal is provided directly to the processor 62. Additionally, the signal filter/amplifier 74 is provided between the misfire sensor signal at lead 54 and the multiplexor 72. Components of the signal filter/amplifier 74 (FIG. 1A) are appropriately selected to filter out any undesired noise and such that an unacceptably high amount of propagation delay is not introduced into the signal path.

The processor 62 is electrically connected to the ROM 66 via a read-only interconnect as is known in the art. The RAM 68 conventionally interfaces to the processor 62 via a read/write interface. A program to be executed by the processor 62 may be stored in either the ROM 66 or the RAM 68 and is described below.

Figure 9A:
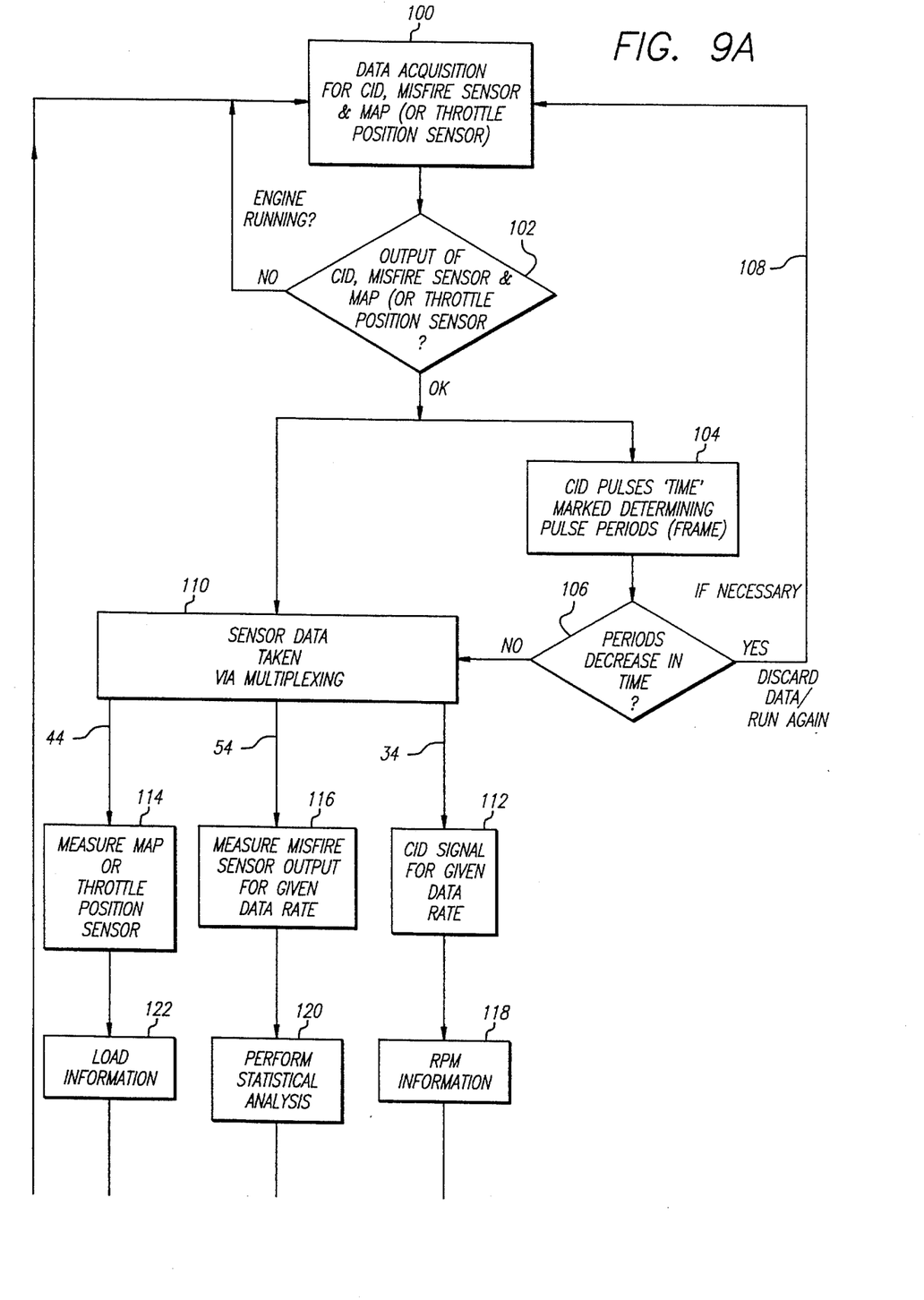
FIGS. 9A and 9B are a flowchart showing the operation of the engine misfire detection system of the present invention.
Figure 9B:
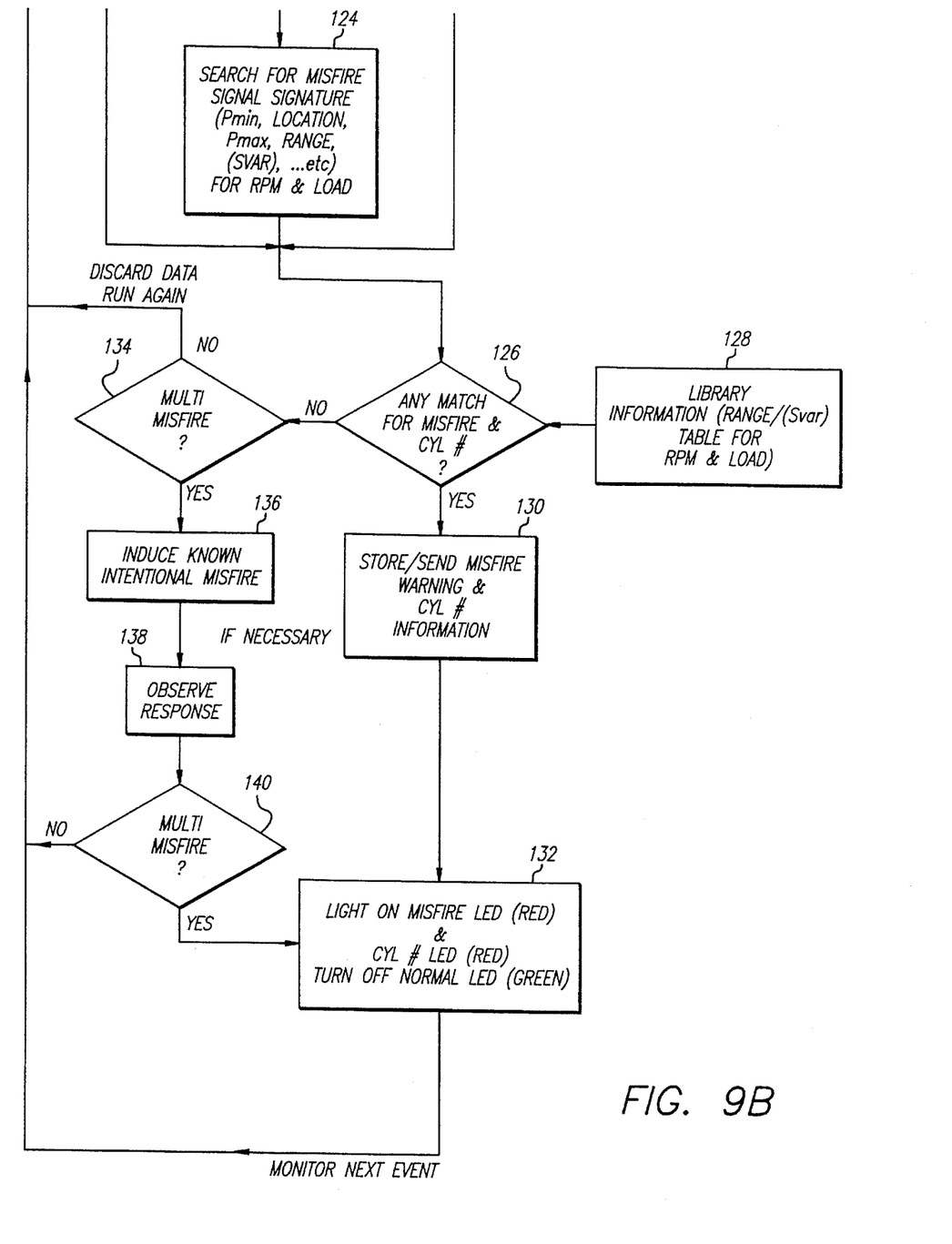

The misfire detection system electronics 60 operate according to a program such as the one represented in the flow chart of FIGS. 9A and 9B. The program begins at block 100 wherein the engine position (CID) signal 34, the manifold absolute pressure signal 44, and the misfire sensor signal 54 are received in digital form into the processor 62. After the processor 62 verifies at 102 that the engine is running and that the inputs are present, block 104 and diamond 106 reset the system along line 108 since decreasing periods between successive CID pulses indicate a deceleration of the engine during which some misfires are to be expected. Block 110 represents the combined functions of the multiplexer 72 and the A/D converter 70 which provide the signals 34, 44, 54 to blocks 112, 114 and 116 respectively. As discussed above, the engine position (CID) signal 34 provides engine rate (or RPM) information at block 118 depending upon the distance between successive CID pulses. If the processor 62 employs the above described statistical analyses, block 120 represents, for example, a SVAR calculation of the misfire sensor signal 54. Block 122 reflects that the manifold absolute pressure signal 44 corresponds to the present engine load condition.

FIG. 9B illustrates at block 124 the aforedescribed misfire condition detection technique wherein samples of the misfire sensor signal 54 are compared to stored empirical data taken under normal engine operating conditions. After a misfire condition is detected, the processor 62 at 126 attempts to identify which particular cylinder has misfired. The index ratios are adjusted with the stored index ratio correction information as represented in block 128. If a misfire match is found, blocks 130, 132 indicate that the processor 62 may be programmed to actuate the appropriate misfire indicator 84 of the display unit 80 (FIG. 1). If no match is found for a single cylinder misfire, the processor 62 may also be programmed at 134 to determine via statistical analyses whether there is a multicylinder misfire condition. Furthermore, optional blocks 136, 138, 140 reflect that the program which is executed by the processor 62 may also include a variety of self-tests or diagnostic features for the engine misfire detection system 30.

Figure 10A:
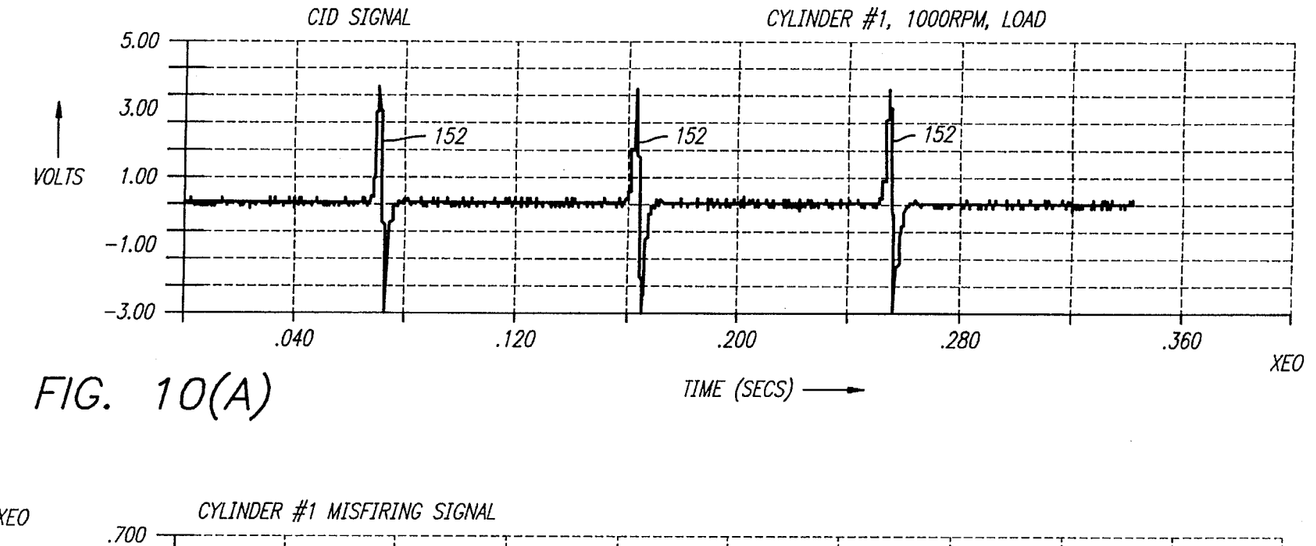
FIG. 10 includes two plots, with one showing the engine position or CID signal, and the other showing the exhaust pressure accompanying a misfire, with both plots having the same engine conditions and time scale.
Figure 10B:
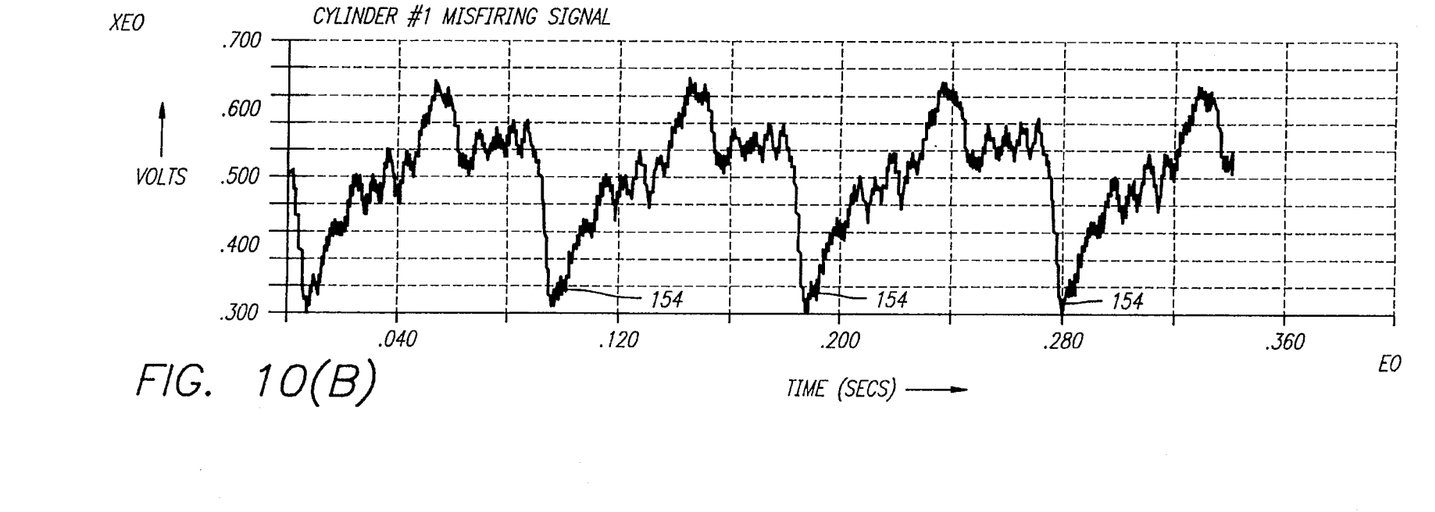

FIG. 10 shows the engine position (CID) signal in the upper portion thereof, with the successive pulses 152 occurring each time the no. 1 cylinder reaches top dead center. The lower plot of FIG. 10 shows a misfiring condition, with the minimums 154 representing the reduced pressure points associated with the misfiring of the same cylinder during successive engine cycle intervals. The misfiring cylinder may be identified, as discussed above, by determining the ratio of the time from one CID signal 152 to the next minimum point 154, and dividing this value by the time between successive CID pulses.

Those skilled in the art will appreciate that various adaptations and modifications of the just described preferred embodiment can be configured without departing from the scope and spirit of the invention. Thus, the principles of the invention may be alternatively implemented by an analog or "hard-wired" circuit, preferably using comparison and reference voltage values which vary with engine speed and load. Therefore, it is to be understood that, within the scope of the appended claims, the invention may be practiced other than as specifically described herein.

TABLE 1

| Engine Rate | Range Under Varying Load Conditions | | | | |
|---|---|---|---|---|---|
| rpm | no load | 0 ft-lb | 50 ft-lb | 100 ft-lb | 150–200 ft-lb |
| 100 | 60 | 78 | 60 | 78 | 78 |
| 200 | 60 | 78 | 60 | 78 | 78 |
| 300 | 60 | 78 | 60 | 78 | 78 |

TABLE 1-continued

| Engine Rate | Range Under Varying Load Conditions | | | | |
|---|---|---|---|---|---|
| rpm | no load | 0 ft-lb | 50 ft-lb | 100 ft-lb | 150–200 ft-lb |
| 400 | 60 | 78 | 60 | 78 | 78 |
| 500 | 60 | 78 | 60 | 78 | 78 |
| 600 | 60 | 78 | 60 | 78 | 78 |
| 700 | 60 | 76 | 61 | 76 | 76 |
| 800 | 60 | 75 | 64 | 75 | 75 |
| 900 | 63 | 76 | 66 | 76 | 76 |
| 1000 | 65 | 77 | 68 | 77 | 77 |
| 1100 | 67 | 81 | 72 | 81 | 81 |
| 1200 | 69 | 88 | 74 | 88 | 88 |
| 1300 | 68 | 93 | 72 | 93 | 93 |
| 1400 | 67 | 93 | 71 | 93 | 93 |
| 1500 | 65 | 90 | 70 | 90 | 90 |
| 1600 | 62 | 88 | 70 | 88 | 90 |
| 1700 | 61 | 86 | 70 | 87 | 103 |
| 1800 | 62 | 87 | 70 | 88 | 115 |
| 1900 | 65 | 85 | 71 | 89 | 125 |
| 2000 | 68 | 86 | 72 | 91 | 132 |
| 2100 | 70 | 89 | 75 | 94 | 140 |
| 2200 | 73 | 90 | 78 | 103 | 147 |
| 2300 | 76 | 99 | 81 | 109 | 152 |
| 2400 | 80 | 105 | 85 | 111 | 157 |
| 2500 | 84 | 108 | 89 | 115 | 162 |
| 2600 | 86 | 110 | 93 | 120 | 164 |
| 2700 | 88 | 112 | 98 | 124 | 165 |
| 2800 | 89 | 114 | 101 | 126 | 166 |
| 2900 | 88 | 111 | 102 | 127 | 165 |
| 3000 | 86 | 105 | 101 | 126 | 163 |
| 3100 | 83 | 103 | 100 | 125 | 158 |
| 3200 | 80 | 97 | 95 | 122 | 153 |
| 3300 | 76 | 93 | 88 | 119 | 147 |
| 3400 | 73 | 89 | 84 | 115 | 140 |
| 3500 | 69 | 84 | 81 | 111 | 132 |
| 3600 | 65 | 80 | 78 | 106 | 120 |
| 3700 | 62 | 78 | 76 | 100 | 112 |
| 3800 | 61 | 76 | 75 | 95 | 111 |
| 3900 | 62 | 76 | 74 | 90 | 111 |
| 4000 | 65 | 76 | 75 | 86 | 113 |
| 4100 | 70 | 78 | 76 | 85 | 115 |
| 4200 | 75 | 78 | 78 | 86 | 119 |
| 4300 | 80 | 80 | 80 | 88 | 122 |
| 4400 | 82 | 82 | 82 | 92 | 125 |
| 4500 | 84 | 83 | 83 | 97 | 126 |
| 4600 | 87 | 84 | 84 | 102 | 126 |
| 4700 | 89 | 84 | 86 | 104 | 125 |
| 4800 | 91 | 84 | 87 | 106 | 125 |
| 4900 | 94 | 84 | 89 | 107 | 125 |
| 5000 | 96 | 84 | 90 | 108 | 125 |
| 5100 | 97 | 84 | 91 | 109 | 125 |
| 5200 | 98 | 84 | 91 | 109 | 125 |
| 5300 | 98 | 84 | 91 | 109 | 125 |
| 5400 | 98 | 84 | 91 | 109 | 125 |
| 5500 | 98 | 84 | 91 | 109 | 125 |
| 5600 | 98 | 84 | 91 | 109 | 125 |
| 5700 | 98 | 84 | 91 | 109 | 125 |
| 5800 | 98 | 84 | 91 | 109 | 125 |
| 5900 | 98 | 84 | 91 | 109 | 125 |
| 6000 | 98 | 84 | 91 | 109 | 125 |
| 6100 | 98 | 84 | 91 | 109 | 125 |
| 6200 | 98 | 84 | 91 | 109 | 125 |
| 6300 | 98 | 84 | 91 | 109 | 125 |
| 6400 | 98 | 84 | 91 | 109 | 125 |
| 6500 | 98 | 84 | 91 | 109 | 125 |

TABLE 2

| Engine | SVAR Under Varying Load Conditions | | | | |
|---|---|---|---|---|---|
| Rate rpm | No Load | 0 ft-lb | 50 ft-lb | 100 ft-lb | 150–200 ft-lb |
| 100 | 13 | 17 | 15 | 15 | 17 |
| 200 | 13 | 17 | 15 | 15 | 17 |
| 300 | 13 | 17 | 15 | 15 | 17 |
| 400 | 13 | 17 | 15 | 15 | 17 |

TABLE 2-continued

| Engine | SVAR Under Varying Load Conditions | | | | |
|---|---|---|---|---|---|
| Rate rpm | No Load | 0 ft-lb | 50 ft-lb | 100 ft-lb | 150–200 ft-lb |
| 500 | 13 | 17 | 15 | 15 | 17 |
| 600 | 13 | 17 | 15 | 15 | 17 |
| 700 | 13 | 16 | 14 | 14 | 18 |
| 800 | 13 | 15 | 14 | 14 | 17 |
| 900 | 13 | 14 | 14 | 14 | 19 |
| 1000 | 13 | 16 | 14 | 14 | 20 |
| 1100 | 13 | 20 | 14 | 14 | 20 |
| 1200 | 13 | 23 | 14 | 14 | 21 |
| 1300 | 13 | 24 | 14 | 14 | 24 |
| 1400 | 13 | 25 | 14 | 14 | 26 |
| 1500 | 13 | 20 | 14 | 14 | 29 |
| 1600 | 13 | 18 | 14 | 14 | 35 |
| 1700 | 13 | 17 | 14 | 15 | 44 |
| 1800 | 13 | 16 | 15 | 16 | 54 |
| 1900 | 13 | 16 | 16 | 19 | 69 |
| 2000 | 14 | 17 | 17 | 23 | 79 |
| 2100 | 14 | 18 | 18 | 31 | 88 |
| 2200 | 14 | 20 | 20 | 37 | 99 |
| 2300 | 14 | 26 | 26 | 42 | 110 |
| 2400 | 15 | 32 | 32 | 53 | 118 |
| 2500 | 16 | 36 | 36 | 62 | 124 |
| 2600 | 17 | 39 | 39 | 67 | 130 |
| 2700 | 18 | 43 | 40 | 69 | 132 |
| 2800 | 19 | 47 | 41 | 70 | 133 |
| 2900 | 20 | 49 | 42 | 70 | 132 |
| 3000 | 21 | 49 | 42 | 70 | 130 |
| 3100 | 22 | 48 | 40 | 69 | 127 |
| 3200 | 23 | 45 | 40 | 68 | 124 |
| 3300 | 23 | 42 | 38 | 67 | 118 |
| 3400 | 22 | 38 | 36 | 63 | 109 |
| 3500 | 20 | 33 | 30 | 56 | 101 |
| 3600 | 19 | 28 | 21 | 43 | 88 |
| 3700 | 18 | 24 | 19 | 30 | 75 |
| 3800 | 17 | 20 | 18 | 18 | 63 |
| 3900 | 17 | 18 | 16 | 16 | 60 |
| 4000 | 17 | 17 | 16 | 16 | 58 |
| 4100 | 17 | 17 | 17 | 17 | 56 |
| 4200 | 17 | 18 | 18 | 18 | 54 |
| 4300 | 18 | 20 | 20 | 20 | 55 |
| 4400 | 18 | 22 | 22 | 22 | 56 |
| 4500 | 19 | 23 | 23 | 23 | 57 |
| 4600 | 19 | 25 | 24 | 24 | 56 |
| 4700 | 20 | 26 | 24 | 24 | 56 |
| 4800 | 20 | 27 | 24 | 24 | 57 |
| 4900 | 21 | 27 | 24 | 24 | 58 |
| 5000 | 23 | 28 | 24 | 24 | 59 |
| 5100 | 23 | 28 | 24 | 24 | 60 |
| 5200 | 23 | 29 | 24 | 24 | 61 |
| 5300 | 23 | 29 | 24 | 24 | 61 |
| 5400 | 23 | 30 | 24 | 24 | 61 |
| 5500 | 23 | 30 | 24 | 24 | 61 |
| 5600 | 23 | 30 | 24 | 24 | 61 |
| 5700 | 23 | 30 | 24 | 24 | 61 |
| 5800 | 23 | 30 | 24 | 24 | 61 |
| 5900 | 23 | 30 | 24 | 24 | 61 |
| 6000 | 23 | 30 | 24 | 24 | 61 |
| 6100 | 23 | 30 | 24 | 24 | 61 |
| 6200 | 23 | 30 | 24 | 24 | 61 |
| 6300 | 23 | 30 | 24 | 24 | 61 |
| 6400 | 23 | 30 | 24 | 24 | 61 |
| 6500 | 23 | 30 | 24 | 24 | 61 |

TABLE 3

| | | Index Ratio Corrected for 50 ft-lb | | | | | | | |
|---|---|---|---|---|---|---|---|---|---|
| Cylinder | rpm | Cyl #1 | Cyl #2 | Cyl #3 | Cyl #4 | Cyl #5 | Cyl #6 | Cyl #7 | Cyl #8 |
| 1 | 590 | 67 | | | | | | | |
|  | 796 | 66 | | | | | | | |
|  | 925 | 63 | | | | | | | |
|  | 1023 | 66 | | | | | | | |

TABLE 3-continued

Index Ratio Corrected for 50 ft-lb

| Cylinder | rpm | Cyl #1 | Cyl #2 | Cyl #3 | Cyl #4 | Cyl #5 | Cyl #6 | Cyl #7 | Cyl #8 |
|---|---|---|---|---|---|---|---|---|---|
|   | 1178 | 67 |  |  |  |  |  |  |  |
|   | 1359 | 65 |  |  |  |  |  |  |  |
|   | 1444 | 65 |  |  |  |  |  |  |  |
|   | 1690 | 68 |  |  |  |  |  |  |  |
|   | 1798 | 68 |  |  |  |  |  |  |  |
|   | 1931 | 65 |  |  |  |  |  |  |  |
|   | 2069 | 62 |  |  |  |  |  |  |  |
|   | 2367 | 60 |  |  |  |  |  |  |  |
|   | 2618 | 57 |  |  |  |  |  |  |  |
|   | 2824 | 57 |  |  |  |  |  |  |  |
|   | 2973 | 62 |  |  |  |  |  |  |  |
|   | 3381 | 59 |  |  |  |  |  |  |  |
|   | 3565 | 59 |  |  |  |  |  |  |  |
|   | 3714 | 59 |  |  |  |  |  |  |  |
|   | 4065 | 58 |  |  |  |  |  |  |  |
| 2 | 595 |  | 154 |  |  |  |  |  |  |
|   | 773 |  | 157 |  |  |  |  |  |  |
|   | 914 |  | 159 |  |  |  |  |  |  |
|   | 1082 |  | 158 |  |  |  |  |  |  |
|   | 1254 |  | 159 |  |  |  |  |  |  |
|   | 1413 |  | 159 |  |  |  |  |  |  |
|   | 1614 |  | 163 |  |  |  |  |  |  |
|   | 1937 |  | 158 |  |  |  |  |  |  |
|   | 2006 |  | 156 |  |  |  |  |  |  |
|   | 2139 |  | 154 |  |  |  |  |  |  |
|   | 2315 |  | 153 |  |  |  |  |  |  |
|   | 3592 |  | 155 |  |  |  |  |  |  |
|   | 2747 |  | 152 |  |  |  |  |  |  |
|   | 3009 |  | 152 |  |  |  |  |  |  |
|   | 3259 |  | 154 |  |  |  |  |  |  |
|   | 3410 |  | 155 |  |  |  |  |  |  |
|   | 3585 |  | 155 |  |  |  |  |  |  |
|   | 3734 |  | 155 |  |  |  |  |  |  |
|   | 4035 |  | 155 |  |  |  |  |  |  |
|   | 4492 |  | 157 |  |  |  |  |  |  |
| 3 | 575 |  |  | 97 |  |  |  |  |  |
|   | 786 |  |  | 95 |  |  |  |  |  |
|   | 843 |  |  | 97 |  |  |  |  |  |
|   | 980 |  |  | 94 |  |  |  |  |  |
|   | 1062 |  |  | 96 |  |  |  |  |  |
|   | 1212 |  |  | 95 |  |  |  |  |  |
|   | 1327 |  |  | 96 |  |  |  |  |  |
|   | 1393 |  |  | 97 |  |  |  |  |  |
|   | 1625 |  |  | 98 |  |  |  |  |  |
|   | 1812 |  |  | 93 |  |  |  |  |  |
|   | 1970 |  |  | 94 |  |  |  |  |  |
|   | 2295 |  |  | 94 |  |  |  |  |  |
|   | 2536 |  |  | 93 |  |  |  |  |  |
|   | 2770 |  |  | 89 |  |  |  |  |  |
|   | 3047 |  |  | 92 |  |  |  |  |  |
|   | 3286 |  |  | 93 |  |  |  |  |  |
|   | 3481 |  |  | 93 |  |  |  |  |  |
|   | 3724 |  |  | 85 |  |  |  |  |  |
|   | 4078 |  |  | 87 |  |  |  |  |  |
|   | 4410 |  |  | 89 |  |  |  |  |  |
|   | 4655 |  |  | 88 |  |  |  |  |  |
|   | 4828 |  |  | 86 |  |  |  |  |  |
| 4 | 569 |  |  |  | 256 |  |  |  |  |
|   | 808 |  |  |  | 254 |  |  |  |  |
|   | 930 |  |  |  | 255 |  |  |  |  |
|   | 1100 |  |  |  | 254 |  |  |  |  |
|   | 1175 |  |  |  | 267 |  |  |  |  |
|   | 1249 |  |  |  | 268 |  |  |  |  |
|   | 1716 |  |  |  | 255 |  |  |  |  |
|   | 2047 |  |  |  | 253 |  |  |  |  |
|   | 2414 |  |  |  | 252 |  |  |  |  |
|   | 2703 |  |  |  | 248 |  |  |  |  |
|   | 2848 |  |  |  | 250 |  |  |  |  |
|   | 3038 |  |  |  | 250 |  |  |  |  |
|   | 3207 |  |  |  | 251 |  |  |  |  |
|   | 3501 |  |  |  | 250 |  |  |  |  |
|   | 3755 |  |  |  | 249 |  |  |  |  |
|   | 3968 |  |  |  | 251 |  |  |  |  |
|   | 4122 |  |  |  | 251 |  |  |  |  |
|   | 4261 |  |  |  | 253 |  |  |  |  |
| 5 | 574 |  |  |  |  | 223 |  |  |  |
|   | 679 |  |  |  |  | 223 |  |  |  |
|   | 735 |  |  |  |  | 225 |  |  |  |
|   | 792 |  |  |  |  | 231 |  |  |  |
|   | 938 |  |  |  |  | 223 |  |  |  |
|   | 1054 |  |  |  |  | 223 |  |  |  |
|   | 1140 |  |  |  |  | 224 |  |  |  |
|   | 1272 |  |  |  |  | 225 |  |  |  |
|   | 1318 |  |  |  |  | 226 |  |  |  |
|   | 1424 |  |  |  |  | 225 |  |  |  |
|   | 1536 |  |  |  |  | 228 |  |  |  |
|   | 1661 |  |  |  |  | 225 |  |  |  |
|   | 1803 |  |  |  |  | 223 |  |  |  |
|   | 1982 |  |  |  |  | 223 |  |  |  |
|   | 2327 |  |  |  |  | 220 |  |  |  |
|   | 2515 |  |  |  |  | 219 |  |  |  |
|   | 2667 |  |  |  |  | 219 |  |  |  |
|   | 2772 |  |  |  |  | 224 |  |  |  |
|   | 2872 |  |  |  |  | 222 |  |  |  |
|   | 3162 |  |  |  |  | 224 |  |  |  |
|   | 3332 |  |  |  |  | 224 |  |  |  |
|   | 3491 |  |  |  |  | 218 |  |  |  |
|   | 3714 |  |  |  |  | 219 |  |  |  |
|   | 3865 |  |  |  |  | 214 |  |  |  |
|   | 4012 |  |  |  |  | 214 |  |  |  |
|   | 4321 |  |  |  |  | 214 |  |  |  |
|   | 4642 |  |  |  |  | 217 |  |  |  |
| 6 | 575 |  |  |  |  |  | 188 |  |  |
|   | 792 |  |  |  |  |  | 189 |  |  |
|   | 902 |  |  |  |  |  | 190 |  |  |
|   | 1131 |  |  |  |  |  | 201 |  |  |
|   | 1231 |  |  |  |  |  | 204 |  |  |
|   | 1334 |  |  |  |  |  | 202 |  |  |
|   | 1432 |  |  |  |  |  | 192 |  |  |
|   | 1629 |  |  |  |  |  | 205 |  |  |
|   | 1937 |  |  |  |  |  | 207 |  |  |
|   | 2139 |  |  |  |  |  | 189 |  |  |
|   | 2373 |  |  |  |  |  | 184 |  |  |
|   | 2718 |  |  |  |  |  | 184 |  |  |
|   | 2907 |  |  |  |  |  | 215 |  |  |
|   | 2932 |  |  |  |  |  | 219 |  |  |
|   | 2965 |  |  |  |  |  | 222 |  |  |
|   | 3055 |  |  |  |  |  | 220 |  |  |
|   | 3241 |  |  |  |  |  | 200 |  |  |
|   | 3501 |  |  |  |  |  | 202 |  |  |
|   | 3724 |  |  |  |  |  | 204 |  |  |
|   | 3952 |  |  |  |  |  | 204 |  |  |
|   | 4122 |  |  |  |  |  | 212 |  |  |
|   | 4373 |  |  |  |  |  | 211 |  |  |
|   | 4555 |  |  |  |  |  | 217 |  |  |
|   | 4842 |  |  |  |  |  | 217 |  |  |
| 7 | 587 |  |  |  |  |  |  | 126 |  |
|   | 898 |  |  |  |  |  |  | 126 |  |
|   | 1092 |  |  |  |  |  |  | 133 |  |
|   | 1231 |  |  |  |  |  |  | 137 |  |
|   | 1355 |  |  |  |  |  |  | 139 |  |
|   | 1444 |  |  |  |  |  |  | 130 |  |
|   | 1518 |  |  |  |  |  |  | 132 |  |
|   | 1747 |  |  |  |  |  |  | 140 |  |
|   | 1883 |  |  |  |  |  |  | 125 |  |
|   | 1970 |  |  |  |  |  |  | 125 |  |
|   | 2112 |  |  |  |  |  |  | 124 |  |
|   | 2340 |  |  |  |  |  |  | 125 |  |
|   | 2546 |  |  |  |  |  |  | 126 |  |
|   | 2786 |  |  |  |  |  |  | 126 |  |
|   | 2889 |  |  |  |  |  |  | 127 |  |
|   | 3038 |  |  |  |  |  |  | 124 |  |
|   | 3090 |  |  |  |  |  |  | 123 |  |
|   | 3277 |  |  |  |  |  |  | 126 |  |
|   | 3546 |  |  |  |  |  |  | 120 |  |
|   | 3897 |  |  |  |  |  |  | 153 |  |
|   | 4213 |  |  |  |  |  |  | 123 |  |
|   | 4361 |  |  |  |  |  |  | 125 |  |

TABLE 3-continued

| | | Index Ratio Corrected for 50 ft-lb | | | | | | | |
|---|---|---|---|---|---|---|---|---|---|
| Cylinder | rpm | Cyl #1 | Cyl #2 | Cyl #3 | Cyl #4 | Cyl #5 | Cyl #6 | Cyl #7 | Cyl #8 |
| | 4842 | | | | | | | 121 | |
| 8 | 597 | | | | | | | | 32 |
| | 805 | | | | | | | | 34 |
| | 912 | | | | | | | | 38 |
| | 1005 | | | | | | | | 38 |
| | 1127 | | | | | | | | 40 |
| | 1317 | | | | | | | | 44 |
| | 1531 | | | | | | | | 40 |
| | 1708 | | | | | | | | 43 |
| | 1942 | | | | | | | | 42 |
| | 2211 | | | | | | | | 24 |
| | 2508 | | | | | | | | 24 |
| | 2762 | | | | | | | | 23 |
| | 3081 | | | | | | | | 30 |
| | 3342 | | | | | | | | 32 |
| | 3501 | | | | | | | | 46 |
| | 3766 | | | | | | | | 23 |
| | 4024 | | | | | | | | 22 |
| | 4273 | | | | | | | | 18 |
| | 4629 | | | | | | | | 20 |

I claim:

1. An engine misfire detection system for detecting and identifying misfiring engine cylinders under varying engine cycle rates and varying engine load conditions, comprising:

a manifold absolute pressure sensor coupled to an intake manifold of an engine providing a manifold absolute pressure signal responsive to a load condition of the engine;

an engine position (CID) sensor providing an engine position (CID) signal in synchronism with revolutions of a cam shaft of the engine;

a misfire sensor coupled to an exhaust manifold of the engine providing a misfire sensor signal responsive to pressure changes within the exhaust manifold; and a processor utilizing stored misfire signal signatures taken under normal engine operating conditions which correlate normal operating condition misfire sensor signal range values of said misfire sensor to different cycle rates of the engine under varying engine load conditions for detecting in real time a misfire condition when a lowest peak value of said misfire sensor signal during a cycle of the engine is outside said normal operating condition misfire sensor signal range values corresponding to a rate and a load condition of the engine during said cycle;

said processor utilizing an index ratio, which is determined from a number of samples of said misfire sensor signal taken by said processor during said cycle and from said rate, and which correlates said misfire sensor signal with said engine position (CID) signal to generate a signal identifying a misfiring cylinder of the engine when said misfire condition is detected.

2. The engine misfire detection system of claim 1 wherein said processor further utilizes stored index ratio correction information to adjust said index ratio depending upon said rate and said varying engine load condition.

3. The engine misfire detection system of claim 2 further comprising at least one memory device within which said misfire signal signatures and said index ratio correction information are stored.

4. The engine misfire detection system of claim 1 wherein said processor comprises a MC68HC11F1 microcontroller.

5. The engine misfire detection system of claim 1 further comprising a memory device within which said misfire signal signatures are stored.

6. The engine misfire detection system of claim 1 wherein said number of samples taken during said cycle is varied by said processor depending upon said rate.

7. The engine misfire detection system of claim 1 wherein said number of samples taken during said cycle is increased when said misfire detection condition is detected.

8. The engine misfire detection system of claim 1 further comprising at least one more misfire sensor coupled to the exhaust manifold, all of said misfire sensors being substantially equidistantly positioned from the engine.

9. An engine misfire detection system for detecting and identifying misfiring engine cylinders under varying engine cycle rates and varying engine load conditions, comprising:

a manifold absolute pressure sensor coupled to an intake manifold of an engine providing a manifold absolute pressure signal responsive to a load condition of the engine;

an engine position (CID) sensor providing an engine position (CID) signal in synchronism with revolutions of a cam shaft of the engine;

a misfire sensor coupled to an exhaust manifold of the engine providing a misfire sensor signal responsive to pressure changes within the exhaust manifold; and misfire detection system electronics utilizing stored misfire signal signatures taken under normal engine operating conditions which correlate normal operating condition misfire sensor signal range values of said misfire sensor to different cycle rates of the engine under varying engine load conditions for detecting in real time a misfire condition when a lowest peak value of said misfire sensor signal during a cycle of the engine is outside said normal operating condition misfire sensor signal range values corresponding to a rate and a load condition of the engine during said cycle, said misfire detection system electronics correlating said misfire sensor signal with said engine position (CID) signal to generate a signal identifying a misfiring cylinder of the engine when said misfire condition is detected.

10. The engine misfire detection system of claim 9 wherein said misfire detection system electronics include a processor which utilizes an index ratio, which is determined from a number of samples of said misfire sensor signal taken by said processor during said cycle and from said rate, and which correlates said misfire sensor signal with said engine position (CID) signal to identify a misfiring cylinder of the engine when said misfire condition is detected.

11. The engine misfire detection system of claim 10 wherein said processor further utilizes stored index ratio correction information to adjust said index ratio depending upon said varying engine load condition.

12. The engine misfire detection system of claim 11 wherein said misfire system detection electronics further comprise at least one memory device within which said misfire signal signatures and said index ratio correction information are stored.

13. The engine misfire detection system of claim 10 wherein said number of samples taken during said cycle is varied by said processor depending upon said rate.

14. The engine misfire detection system of claim 10 wherein said number of samples taken during said cycle is increased when said misfire detection condition is detected.

15. The engine misfire detection system of claim 10 wherein said processor comprises a MC68HC11F1 microcontroller.

16. The engine misfire detection system of claim 9 wherein said misfire system detection electronics further comprise a memory device within which said misfire signal signatures are stored.

17. The engine misfire detection system of claim 9 further comprising at least one more misfire sensor coupled to the exhaust manifold, all of said misfire sensors being substantially equidistantly positioned from the engine.

18. A method for detecting and identifying misfiring engine cylinders under varying engine cycle rates and varying engine load conditions, employing an engine misfire detection system including a manifold absolute pressure sensor coupled to an intake manifold of an engine, an engine position (CID) sensor, a misfire sensor coupled to an exhaust manifold of the engine, and misfire detection system electronics, the method comprising the steps of:

providing, from the manifold absolute pressure sensor, a manifold absolute pressure signal indicating a load condition of the engine;

providing, from the engine position (CID) sensor, an engine position (CID) signal in synchronism with revolutions of a cam shaft of the engine;

providing, from the misfire sensor, a misfire sensor signal responsive to pressure changes within the exhaust manifold;

detecting in real time a misfire condition with the misfire detection system electronics by utilizing misfire signal signatures taken under normal engine operating conditions which correlate normal operating condition misfire sensor signal range values of the misfire sensor to different cycle rates of the engine under varying engine load conditions when a lowest peak value of the misfire sensor signal during a cycle of the engine is outside the normal operating condition misfire sensor signal range values corresponding to a rate and a load condition of the engine during the cycle; and identifying a misfiring cylinder of the engine with the misfire detection system electronics when the misfire condition is detected by correlating the misfire sensor signal with the engine position (CID) signal.

19. The method for detecting and identifying misfiring engine cylinders of claim 18 wherein the misfire detection system electronics include a processor, and wherein said detecting step comprises utilizing an index ratio, which is determined from a number of samples of the misfire sensor signal taken by the processor during the cycle and from the rate, and which correlates the misfire sensor signal with the engine position (CID) signal, to identify a misfiring cylinder of the engine when the misfire condition is detected.

20. The method for detecting and identifying misfiring engine cylinders of claim 19 further comprising the step of:

adjusting the index ratio with the processor depending upon the varying engine load condition by utilizing stored index ratio correction information.

21. An engine misfire detection system for detecting misfiring engine cylinders under varying engine cycle rates and varying engine load conditions, comprising:

a pressure sensor coupled to an exhaust system of an engine for providing electrical signals corresponding to pressures within the exhaust system;

sensors for providing speed and load conditions of the engine;

circuitry for providing and adjusting a range of normal engine operating exhaust pressure signals taken under normal engine operating conditions in response to changes in said speed and load conditions; and detection circuitry for detecting in real time when said electrical signals drop below the normal operating range as adjusted for said speed and load conditions.

22. The engine misfire detection system of claim 21 further comprising:

indication circuitry for identifying from said electrical signals a cylinder of the engine which has misfired when said detection circuitry detects that said electrical signals have dropped below the normal operating range.

23. An engine misfire detection system for defecting misfiring engine cylinders under varying engine load conditions, comprising:

a pressure sensor coupled to an exhaust system of an engine for providing electrical signals corresponding to pressures within the exhaust system;

a sensor providing load conditions of the engine;

circuitry for providing and adjusting a range of normal engine operating exhaust pressure signals taken under normal engine operating conditions in response to changes in said load conditions; and detection circuitry for detecting in real time when said electrical signals drop below the normal operating range, as adjusted for said load conditions.

* * * * *